United States Patent [19]

Millington

[11] Patent Number: 4,497,169

[45] Date of Patent: Feb. 5, 1985

[54] CHAIN COMPONENTS

[75] Inventor: Michael J. Millington, Kidderminster, England

[73] Assignee: Parsons Controls Limited, Worcestershire, England

[21] Appl. No.: 503,148

[22] PCT Filed: Oct. 7, 1982

[86] PCT No.: PCT/GB82/00287

§ 371 Date: May 19, 1983

§ 102(e) Date: May 19, 1983

[87] PCT Pub. No.: WO83/01285

PCT Pub. Date: Apr. 14, 1983

[30] Foreign Application Priority Data

Oct. 7, 1981 [GB] United Kingdom ............... 8130349

[51] Int. Cl.$^3$ ............................................. F16G 13/06
[52] U.S. Cl. .......................................... 59/84; 59/90; 59/78
[58] Field of Search ................... 59/85, 90, 86, 78, 93, 59/84; D8/499

[56] References Cited

U.S. PATENT DOCUMENTS

| 251,049 | 12/1881 | Horack | 59/90 |
| 543,087 | 7/1895 | Ferris | 59/86 |
| 809,511 | 1/1906 | Lien | 59/86 |
| 1,848,491 | 3/1932 | Nourse | 59/90 |
| 2,052,066 | 9/1936 | Younie | 59/85 |
| 4,068,467 | 1/1978 | Schreyer et al. | 59/93 |
| 4,079,584 | 3/1978 | Shahan | 59/86 |

FOREIGN PATENT DOCUMENTS 1596815 9/1981 United Kingdom ............... 59/93

Primary Examiner—Daniel C. Crane
Assistant Examiner—David B. Jones
Attorney, Agent, or Firm—Kemon & Estabrook

[57] ABSTRACT

An elongate main link 2 for a chain or cable sling shaped as a pair of generally semi-circular crown portions 4 connected by parallel-extending side portions 6 has the crown portions 4 formed with inner and outer circumferentially extending flanges 8 and 10 connected by webs 12 and the side portions 6 formed with inner flanges 14 joined to outwardly extending webs 16.

2 Claims, 1 Drawing Figure

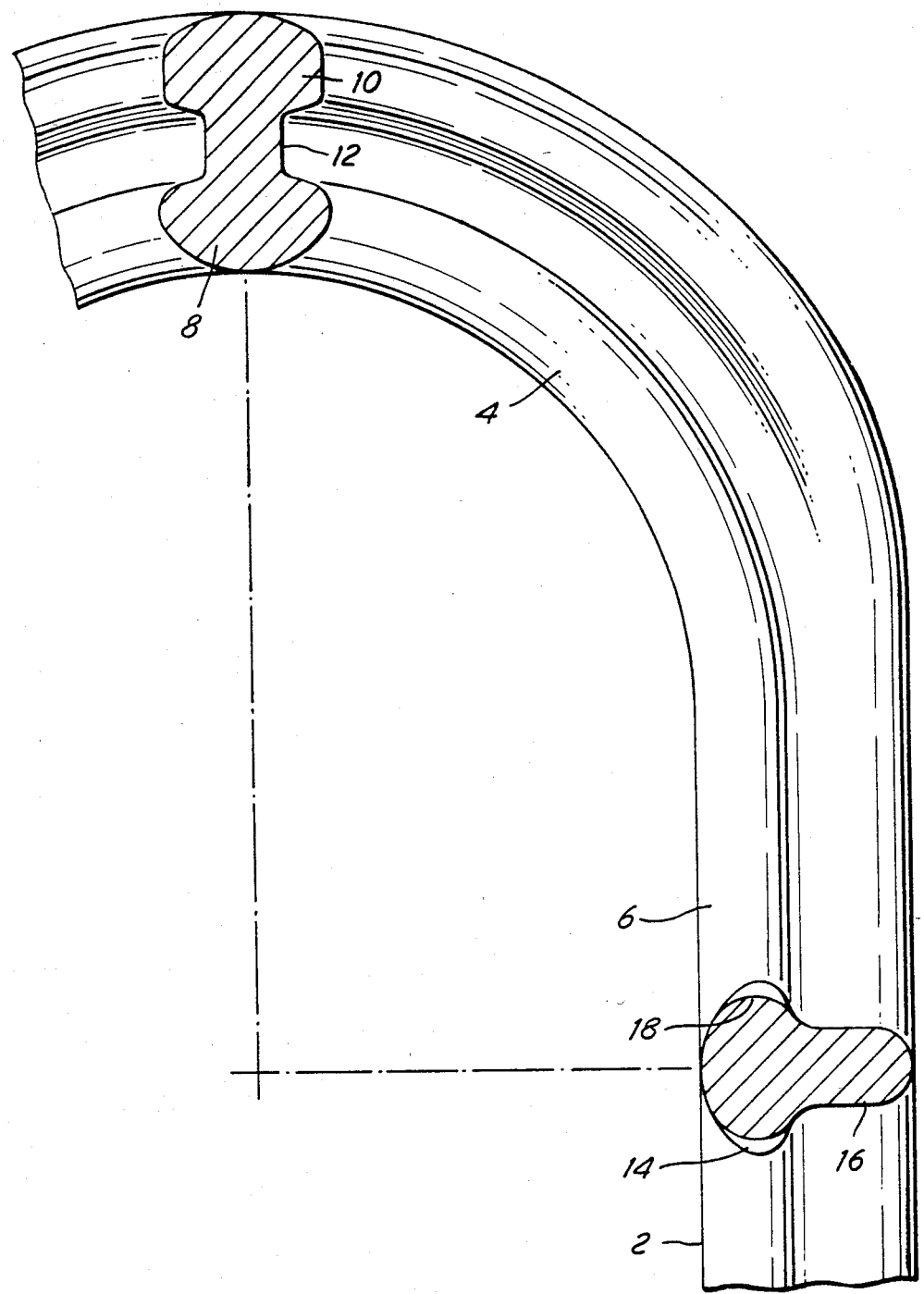

CHAIN COMPONENTS

DESCRIPTION

This invention relates to chain components and, more particularly, to a main link which provides a connection between a main hoist cable or chain and a plurality of chain or cable legs forming a sling.

It is normal for main links for chain or wire rope slings to be of oval shape. The oval shape ensures that the maximum line of force passes through the centre line of the two opposing crowns of the link and because of the oval shape, stress distribution is more favourable than in the case of a ring with the result that there is a reduction of maximum stresses. However, the two crowns of the oval link are subjected during use to curved beam stresses and they require maximum modulus of section to resist bending stresses which are set up by proof loads.

Whilst such main links of oval shape may be made of straight sided bar stock of a section giving a modulus as required by a consideration of the maximum bending stresses, this gives rise to a considerable redundancy in material and, at least in the higher tensile ranges, causes difficulties in achieving satisfactory heat treatment owing to the size of the links and what is known as "mass effect." We have already proposed in our U.K. Patent Specification No. 1 467 445 to provide a main link for a chain or wire rope sling, which link is of generally oval construction and is fabricated from bar stock and wherein the cross section of the bar stock is a maximum at the centre of each crown portion, which crown portions are of unitary construction, and then decreases towards the side portions of the link, the latter being of uniform section throughout their length.

According to the present invention there is provided an elongate main link for a chain or cable sling including crown portions of generally semi-circular form connected by parallel extending side portions, wherein crown portions are formed with inner and outer, circumferentially extending, flanges connected by a web and the side portions are formed with an inner flange connected to an outwardly extending web.

The invention will now be described, by way of example, with reference to the accompanying drawing, which includes cross sectional views, of a portion of a main link 2 of symmetrical and generally elongate form, having crown portions 4 of semi-circular form connected by parallel extending side portions 6.

The crown portions 4 are formed with inner and outer, circumferentially extending, flanges 8 and 10 connected by a web 12 extending parallel to a diametrical plane lying centrally of the crowns. The side portions 6 are formed with an inner flange 14 connected to a web 16 extending outwardly from the flange parallel to the aforesaid diametrical plane. The inner flange 14 of the side portions is substantially identical in cross-section with the inner, circumferentially extending, flange 8 of the crown portions 4, and the web 16 of the side-portions is substantially identical in thickness, perpendicular to the aforesaid diametrical plane, with the web 12 of the crown portions. The outer, circumferentially extending, flange 10 of the crown portions 4 is reduced progressively in thickness, perpendicular to the aforesaid diametrical plane, over 30° sectors of the crown portions adjoining the side portions to correspond in thickness to the web of the side portions, and the radius of curvature decreases slightly such that the width, in the aforesaid diametrical plane, across the inner flange and web of each of the side portions is less than the width across the inner and outer flanges of each of the crown portions, in central regions thereof.

Central regions 18 of the inner flanges of the side portions are thinned down slightly, perpendicular to the aforesaid diametrical plane, to permit passage of jaw portions of clevis connectors (not shown) for attachment to the main link.

In cross-section, the various flanges are shaped to have advantageous bending moduli in relation to cross-sectional area, the cross-sectional peripheries being formed with merging curves, giving a generally rounded shape.

By designing the cross-section of the crown portions 4 with flanges 8 and 10 such that the bulk of material is disposed toward the inner and outer surfaces a bending modulus of sufficient strength may be obtained with a reduction in material compared with a cross-section of constant thickness. The cross-section of the side portions 6 is designed to be of sufficient area as to give the requisite tensile strength whilst merging smoothly, without giving rise to localised stress concentration under load, with the crown portions. The generally rounded form of the cross-sections also serves to avoid localised stress-concentrations under load.

What is claimed is:

1. A chain and cable sling device comprising an elongate main link, said elongate main link having crown portions of generally semi-circular form and, connecting the crown portions, parallel extending side portions; said crown portions each being formed with an inner circumferentially extending flange, an outer circumferentially extending flange and connecting the inner flange and the outer flange a radially extending web; and said parallel extending side portions each being formed with an inner flange and an outwardly extending web; the inner flanges of the crown portions and the inner flanges of the side portions being of a substantially identical constant cross-section; the webs of the crown portions and the outwardly extending webs of the side portions being of substantially identical constant thickness; the outer flanges of the crown portions being of substantially constant cross-section over central 120° sectors and of progressively decreasing cross-section thickness over 30° sectors adjoining the side portions, the cross-section thickness of the outer flanges decreasing smoothly to merge with the thickness of the outwardly extending webs of the side portions.

2. A chain and cable sling device as claimed in claim 1, wherein the inner flanges of the side portions are each formed with central regions having a cross-sectional thickness slightly less than the cross-sectional thickness of the remainder of the inner flanges of the side portions.

* * * * *